(12) United States Patent
Wang

(10) Patent No.: US 6,568,728 B1
(45) Date of Patent: May 27, 2003

(54) POSITIONING STRUCTURE OF GRILL TONGS

(76) Inventor: Yu-Tzu Wang, 21F-3, No. 189, Sec. 2, Keelung Rd., Taipei (TW)

( * ) Notice: Subject to any disclaimer, the term of this patent is extended or adjusted under 35 U.S.C. 154(b) by 0 days.

(21) Appl. No.: 10/066,708

(22) Filed: Feb. 6, 2002

(51) Int. Cl.[7] .......................... A47G 21/10; A47J 43/28
(52) U.S. Cl. .......................... 294/16; 294/28; 294/99.2; 294/106
(58) Field of Search ................ 294/3, 5, 7, 8, 294/8.5, 11, 16, 28–31.1, 33, 99.2, 100, 106, 110.1, 115–117; D7/686, 687, 688

(56) References Cited

U.S. PATENT DOCUMENTS

| | | | | |
|---|---|---|---|---|
| 763,338 A | * | 6/1904 | Baker | 294/116 X |
| 2,864,645 A | * | 12/1958 | Meldrum | 294/106 |
| D254,767 S | * | 4/1980 | Christen, Jr. | D7/686 |
| 5,199,756 A | * | 4/1993 | Bartlett et al. | 294/16 |
| 6,056,338 A | * | 5/2000 | Kerr | 294/16 |
| 6,089,631 A | * | 7/2000 | Thurlow et al. | 294/16 |
| 6,092,847 A | * | 7/2000 | Kwan | 294/16 |

* cited by examiner

*Primary Examiner*—Eileen D. Lillis
*Assistant Examiner*—Paul T. Chin
(74) *Attorney, Agent, or Firm*—Bacon & Thomas, PLLC

(57) ABSTRACT

A positioning structure for grill tongs. The positioning structure includes a lever plate positioned over the intersection of the tong bodies that are capable of levering. Two tongs bodies are located on opposite sides of the connection portion and are formed with notches each at top and bottom sides. The grill tongs structure can move the lever, thus making two sides of lever plate capable of being fitted in the notches of the tong body ends so that the two tong bodies can operate. The lever plate can be put in a middle position so that two sides of the lever plate will be blocked by the middle portion of the tong body ends, making them unable to be opened.

1 Claim, 4 Drawing Sheets

POSITIONING STRUCTURE OF GRILL TONGS

BACKGROUND OF THE INVENTION

1. Field of the Invention

The invention relates to a positioning structure for grill tongs, which utilizes a lever plate located at the intersection of tong bodies capable of levering the positioning structure up and bottom at the top and bottom notches located at the intersection edge of the tongs bodies, allowing the sides of the lever plate inserted into the notches to open the tong bodies or the lever plate being positioned against the intersection edge to close the tong bodies.

2. Description of Related Art

Tongs used to pick food are normally made of elastic material, such as elastic steel or plastic piece formed by bending as a whole. As such it will always stay open during normal operation, when picking up an object, one applies force on both sides of tong bodies to get them together to achieve a picking purpose. Another tong structure is adapted with two independent tong bodies, in which one side of both bodies is provided with an elastically activated springy plate to connect each other. Hence, despite having two independent parts, they can still perform the picking function and the picking concept is the same as that of one-body tongs. Certainly, such tongs during normal condition keeps the tongs bodies always open.

Regardless of whatever one-body bent forming type or two tong bodies the elastic connection type is, the mouth of the tongs during normal operation takes the open status. Tongs have thin and slender shape, and its size during the process of picking object is apparently smaller than its size in normal condition when it is not in use. As mentioned, tongs stay open when it is not in use, while the size generated by opening tongs implicitly causes unnecessary occupation of storage space. Another phenomenon is that tongs may be temporarily kept for next usage. In the meantime, most tongs will be randomly put in a basket, causing the basket capacity to get smaller as a result of the unmanaged space occupation of open tongs.

SUMMARY OF THE INVENTION

To solve the space occupation problem for tongs temporarily not in use, the only way is to enclose tongs for storage or placement. Certainly, the way of enclosing the tongs is temporary, implying that it is still possible to open by unlocking it during operation of the tongs. To achieve this, the invention provides a positioning structure for tongs such that it is provided with a lever plate over the intersection of two tongs bodies capable of performing the adjustment for top, middle and bottom positions. In addition, top and bottom notches are provided on edges of the opposite sides of the two tongs bodies end edges over the intersection of the lever plate so that the tongs can be positioned at high or low positions with the lever plate. The two sides of lever plate can just be inserted in the top notch or bottom notch of the opposite edge of the tongs bodies to extend the contact ends of the tong bodies properly to be ready for the operation state of tongs. On the other hand, when putting the lever plate to the middle position, two sides of the lever plate go against the opposite edges of the tongs bodies, restraining the connection end of the tongs bodies from being extended and thus causing the tongs to be closed and unable to be open. By means of the fitting conditions of the positions of the lever with respect to the opposite edges of the tongs bodies, the open or closed conditions of the tongs can be determined. Consequently, under circumstance that no operation or long storage time is required, the tongs can be positioned by closing it thus solving the space occupation problem caused by the storage of open tongs.

DESCRIPTION OF THE PREFERRED EMBODIMENTS

Figure 1:
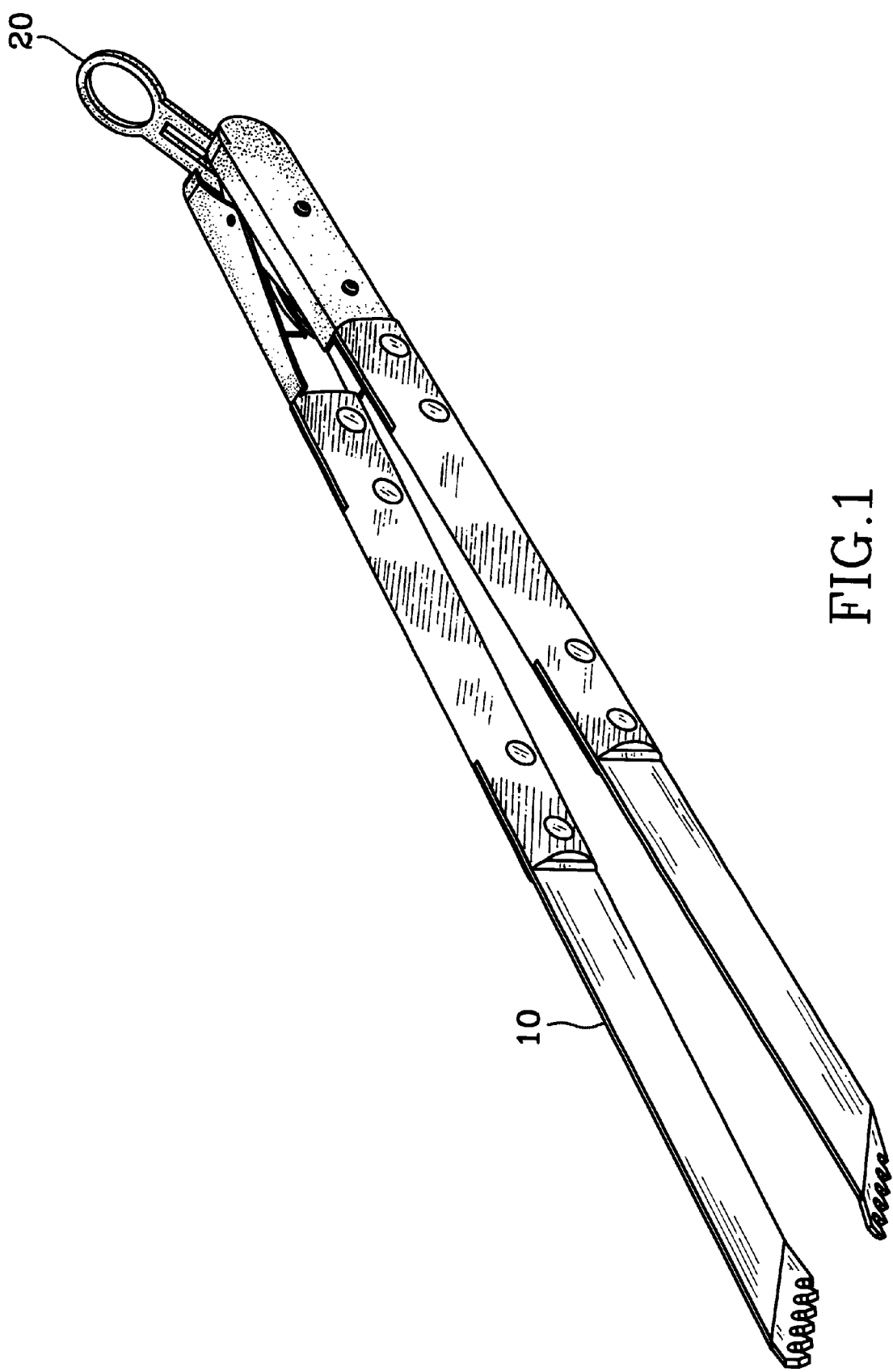
FIG. 1 shows a perspective view of the invention.
Figure 2:
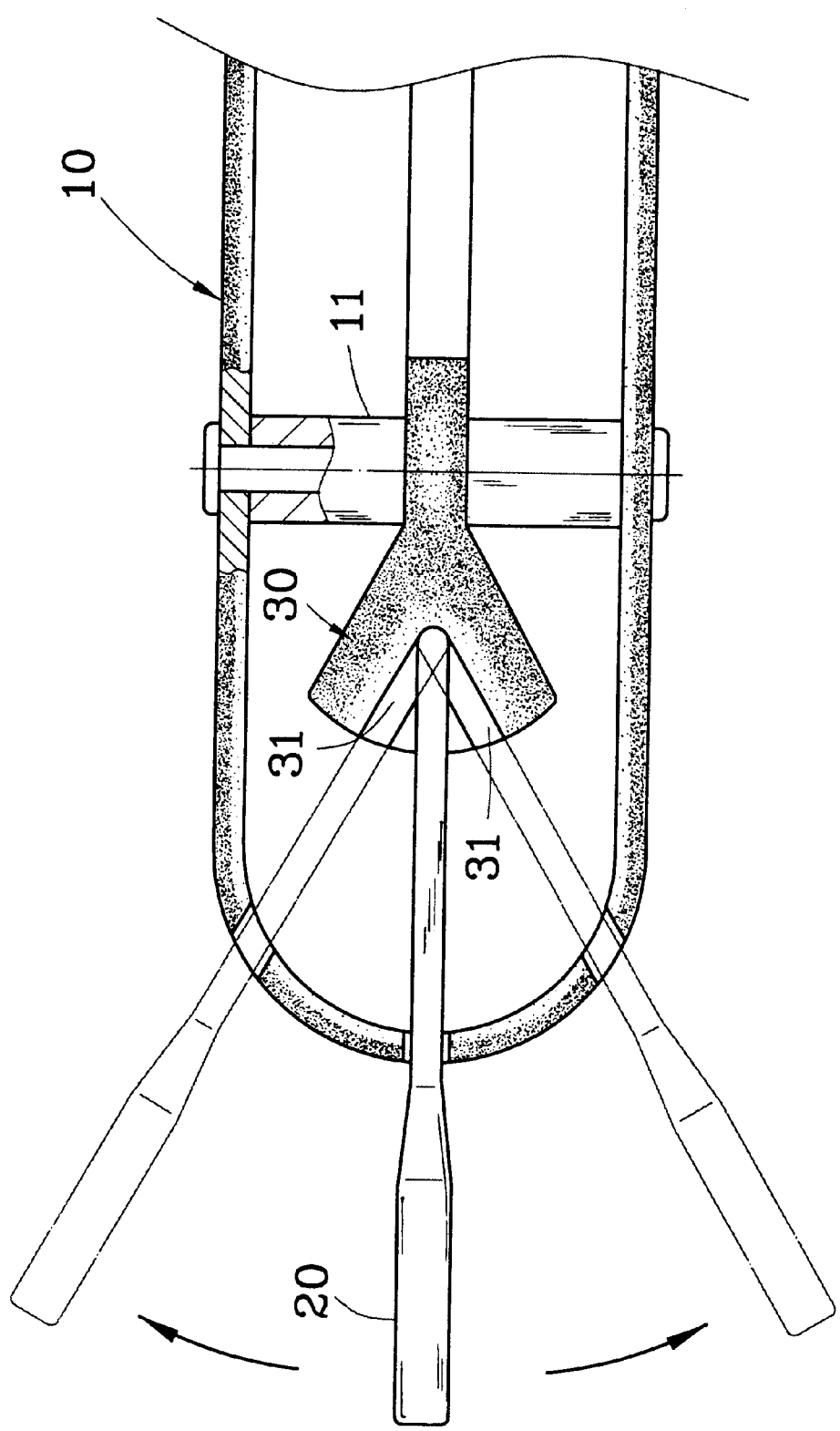
FIG. 2 is a front cross sectional diagram of the adjustment positioning structure of the invention.
Figure 3:
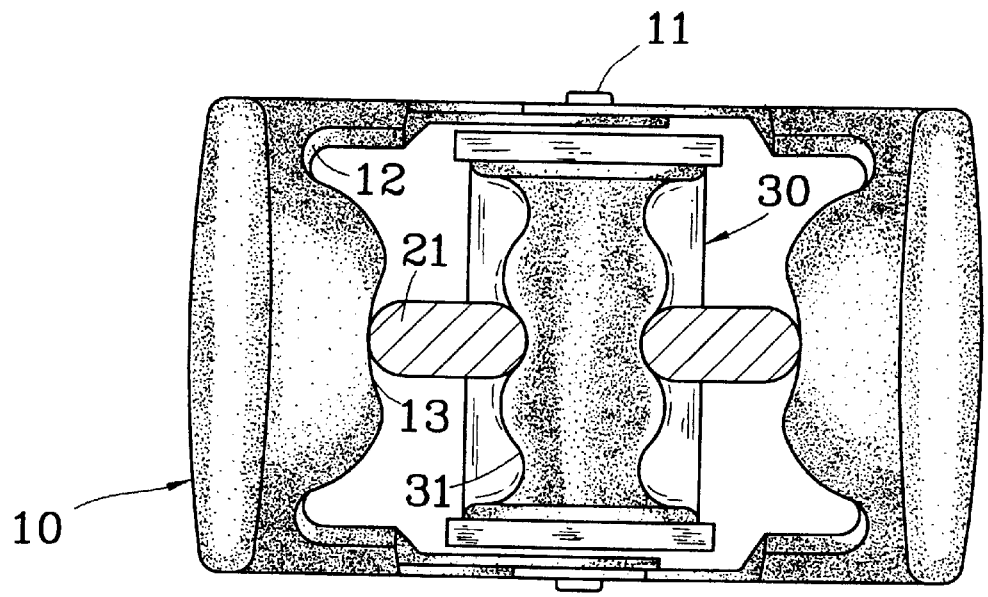
FIGS. 3 & 4 show the side operation of the adjustment positioning structure of the invention.
Figure 4:
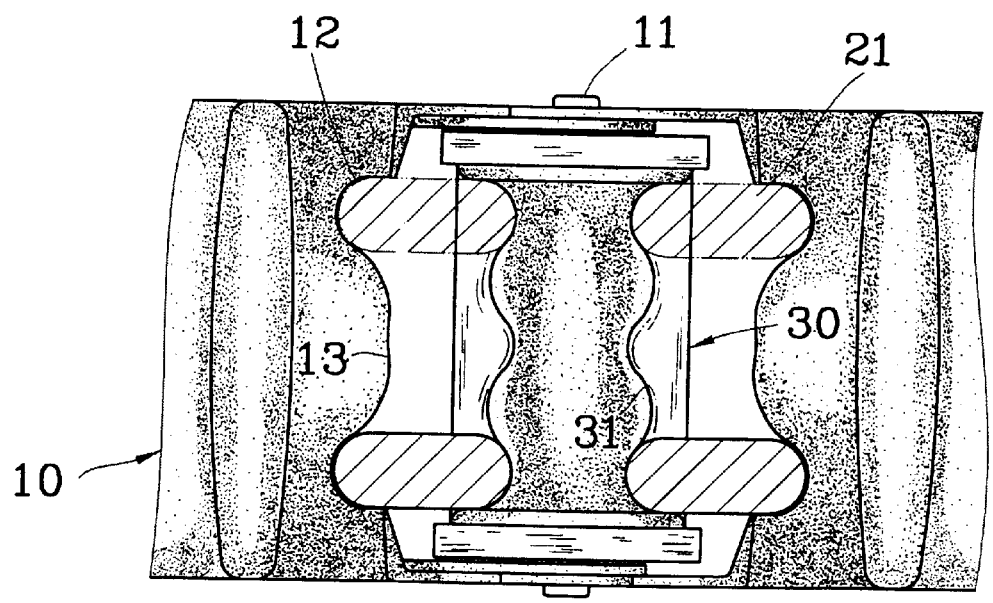
Figure 5:
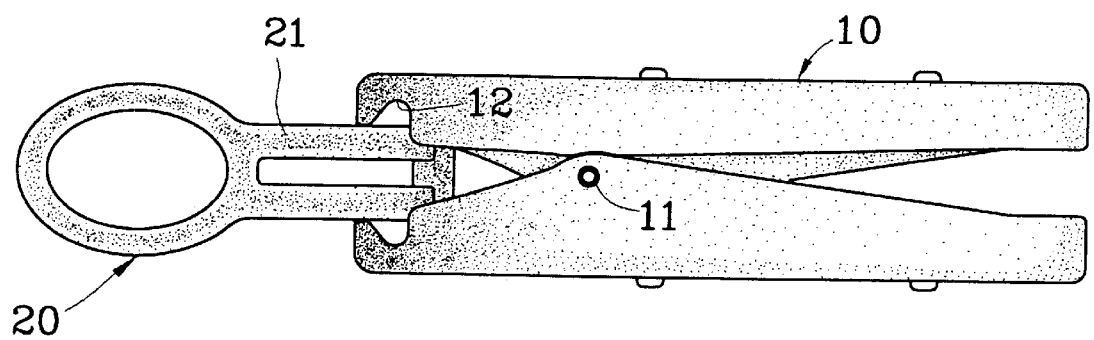
FIGS. 5 & 6 show the top operation of the adjustment positioning structure of the invention.
Figure 6:
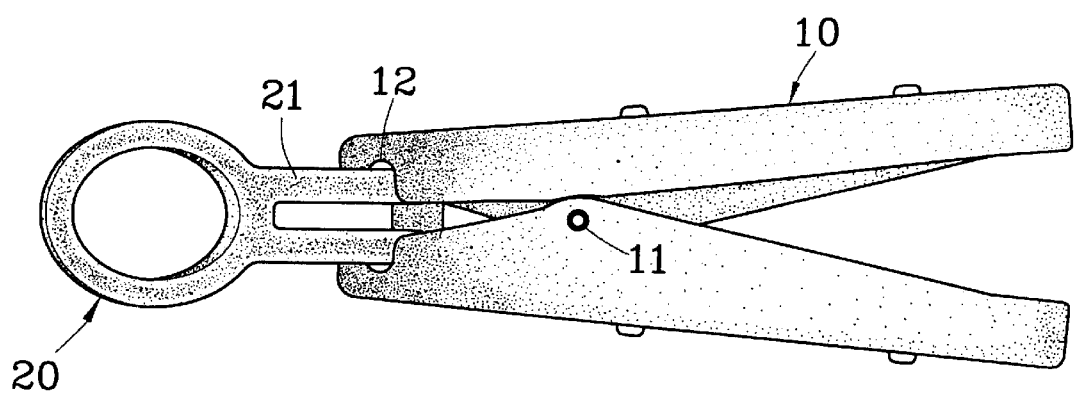

The structure of the tongs in the invention is shown in FIG. 1, which is composed of the left and right tong bodies 10 connected by a hinge at one end. The connection end of the tongs includes a lever plate 20. Please refer to FIGS. 2–6 which show the lever plate 20 hinged on a sector seat 30, in which the sector seat 30 is hinged by penetrating a pin 11 therein and combining the two tongs bodies, and the sector seat 30 is provided with a wave surface on its left and right sides and with top, middle and bottom notches 31. The inner sides of two legs 21 of the lever plate 20 are fitted in one of the notches 31. The contact end edge of the tongs bodies 10 are formed with deep notches 12 opposing the top and bottom notches 31 of the sides of the sector seat 30 and a shallow notch 13 opposing the middle notch 31. The outer sides of the two legs 21 of the lever plate 20 are fitted in one pair of the deep notches 12 or in the shallow notches 13.

As mentioned in the structure of the tongs, when the lever plate 20 is positioned at the middle position, the inner and outer sides of each of the legs 21 exactly jam the middle notch of the sector seat 30 and the shallow notch 13 of the end edge of the tong bodies 10 and in this condition, the extended gap of the contact end edges of the tongs bodies 10 are locked by the lever plate 20, simply making the tongs bodies 10 to be mutually parallel and closed, a state unable to provide any picking function. On the contrary, if the lever plate 20 is positioned at top or bottom positions, the inner and outer sides are jammed in the top or bottom notches 31 of the sector seat 30 and jammed in the top or bottom deep notch 12 of the contact end edges of the tong bodies 10 and in this condition, as part of the width of the lever plate 20 sinks in the deep notch 12 of the contact end edge, the formed gap with respect to the tong bodies 10 is smaller than that when the lever plate 20 is positioned in the middle notch, allowing the tongs bodies 10 to pick up an object by extending an angle outwardly with the connection end as the axis thereof.

Whether the tongs are open or closed is determined by the gap size formed by the position located by the lever plate with respect to the connection end of the two tongs bodies. Therefore, the open or closed state can be controlled by moving the lever plate to a proper position and the space occupation problem caused is further resolved by closing and locking the tongs at the no usage condition.

What is claimed is:

1. A positioning structure for grill tongs, comprising:

left and right tongs hinged together by a hinge;

a sector seat positioned between the left and right tongs, the sector seat having at least three wave-shaped grooves on each of the two sides thereof respectively facing the left and right tongs, the three wave-shaped grooves comprising a pair of outer grooves and a middle groove therebetween;

each of the tongs comprising an inner surface having a pair of deep notches and a shallow notch positioned between the deep notches, the notches correspond to respective wave-shaped grooves of the sector seat;

a lever plate comprising a pair of legs, such that the pair of legs can be secured between the middle grooves of the sector seat and the shallow notches of respective ones of the left and right tongs, to lock the tongs in a compacted position; and wherein when the pair of legs of the lever plate are positioned between the outer grooves of the sector seat and corresponding ones of the deep notches of the left and right tongs, the left and right tongs are permitted to pivot.

* * * * *